United States Patent [19]

White et al.

[11] Patent Number: 4,825,534
[45] Date of Patent: May 2, 1989

[54] METHOD OF MANUFACTURING HEAT-WELDABLE THERMOPLASTIC FITTINGS

[75] Inventors: Peter White, Sheffield; Ronald A. Street, Derby; Christopher I. Greaves, Sheffield; Gordon Harrison, Notts, all of United Kingdom

[73] Assignee: Du Pont U.K. Ltd., Stevenage/Herts, United Kingdom

[21] Appl. No.: 92,216

[22] Filed: Sep. 2, 1987

[30] Foreign Application Priority Data

Sep. 9, 1986 [GB] United Kingdom ............... 8621679

[51] Int. Cl.⁴ ............................................. H05B 3/58
[52] U.S. Cl. ........................................ 29/611; 29/423; 285/21; 219/544; 264/272.18; 264/163; 264/278; 264/334; 156/294
[58] Field of Search .................. 29/611, 613, 423; 285/21; 219/544; 264/272.18, 212.19, 163, 275, 278, 334; 156/294

[56] References Cited

U.S. PATENT DOCUMENTS

| | | | |
|---|---|---|---|
| 3,061,503 | 10/1962 | Gould et al. | 156/272 |
| 3,062,940 | 11/1962 | Bauer et al. | 219/19 |
| 3,549,477 | 12/1970 | Burgman | 264/275 |
| 3,943,334 | 3/1976 | Strum | 285/21 |
| 3,987,276 | 10/1976 | Vogelsanger et al. | 219/535 |
| 4,313,053 | 1/1982 | Sturm | 285/21 |
| 4,362,684 | 12/1982 | Thalmann | 264/230 |
| 4,365,144 | 12/1982 | Reich et al. | 219/535 |
| 4,530,521 | 7/1985 | Nyffeler | 285/21 |
| 4,622,087 | 11/1986 | Ansell | 285/21 |
| 4,727,242 | 2/1988 | Barfield | 219/544 |

FOREIGN PATENT DOCUMENTS 1440713 6/1976 United Kingdom .

Primary Examiner—P. W. Echols

[57] ABSTRACT

Welding muffs for joining thermoplastic pipes are molded using a core in which are placed terminals supported by plastic posts which may be removable and/or frangible so that when the cores are withdrawn the plastic posts do not prevent withdrawal.

7 Claims, 3 Drawing Sheets

METHOD OF MANUFACTURING HEAT-WELDABLE THERMOPLASTIC FITTINGS

BACKGROUND OF THE INVENTION

This invention relates to a method of manufacturing heat-weldable thermoplastic fittings such as pipe welding couplings (known as muffs) used in welding together sections of thermoplastic pipe.

These welding muffs normally incorporate a resistance wire which is used to heat the material of the muff and the material of the adjacent pipes during welding of two sections of pipe together.

The wire has to be connected to terminals in the muff and an object of the invention is to provide an improved method of manufacturing such muffs embodying new methods of supporting the terminal posts during the molding of the muffs.

SUMMARY OF THE INVENTION

The present invention provides a method of manufacturing a heat-weldable thermoplastic fitting such as a pipe welding muff, the method comprising:

(a) supporting the terminals on a molding core by means of plastic or metal posts;

(b) winding an electrical heater wire around the core from one post to the other;

(c) molding the muff around the core thus encapsulating the terminals; and (d) removing the plastic or metal posts or parts of them.

DETAILED DESCRIPTION OF THE INVENTION

The fittings prepared according to the process of the present invention can be made from a wide variety of thermoplastic materials, including, for example, any non-crosslinked, thermoplastic homopolymers and copolymers. Specific examples include homopolymers such as polyethylene, polypropylene, and polybutene; copolymers of ethylene and vinyl esters of aliphatic carboxylic acids such as vinyl acetate and vinyl propionate; copolymers of ethylene and alkyl acrylate and methyl methacrylate; copolymers of ethylene and other alpha-olefins such as propylene, butene, hexene and octene; copolymers of ethylene and ethylenically unsaturated carboxylic acids such as acrylic acid, methacrylic acid and the like. Still other classes of thermoplastic materials which can be used include polyacetals, polyvinyl chloride and chlorinated polyvinyl chloride, polyamides and acrylics such as polymethyl methacrylate.

Preferred thermoplastic materials which can be used in the invention include polyethylene such as that manufactured by Du Pont under the trade mark ALATHON, ethylene-octene and ethylene-hexene copolymers.

The posts in the fittings prepared according to the present invention can be of frangible material adapted to shear when, after molding the muff, the core is removed from the muff. Thus the posts may be arranged so that they project into radial bores in the core and, after molding, the core is removed, thus shearing the posts, leaving part of each post inside the metal terminal and part in the core.

If the core is made hollow, the parts of the posts remaining in the cores may then be pushed inwardly to the center of the core and removed.

Alternatively, the posts can be in the form of plastic or metal bolts which may be screwed into threaded blind bores in the core so as to support the terminals during molding. When molding is complete, the posts may be unscrewed through bores in the muff which are normally provided for connection of electric wire for supplying the heating current.

In another alternative arrangement, the posts are provided in the form of telescopic posts which are arranged in bores in the hollow core and are arranged so that they project outwardly beyond the core so as to receive the metal terminals. When molding is completed, the telescopic posts may be telescoped inwardly so as to remove the projecting portions of the posts from the metal terminals.

This may be achieved for instance by having spring-loaded telescopic posts which can be gripped internally within the core by means of pliers, etc., or the two parts of a telescopic post may be threaded and engaged with each other and there may be nuts formed on the telescopic posts internally so as to enable them to be collapsed telescopically.

Figure 1:
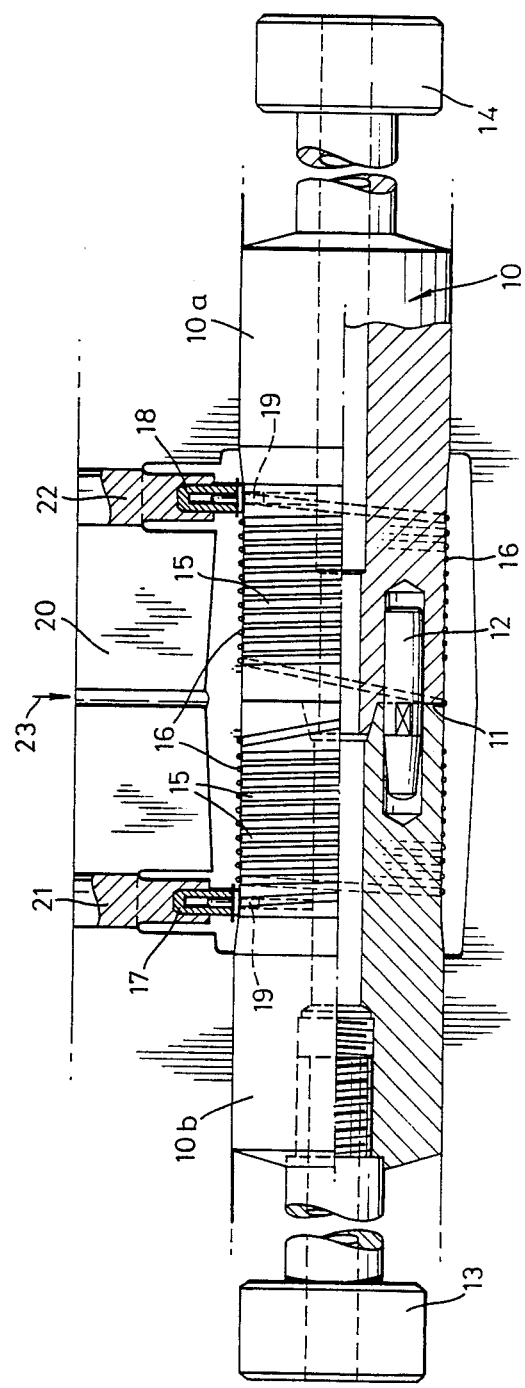
FIG. 1 is a part-sectional elevation of a core or mandrel located in a mold and includes posts for supporting terminals in accordance with this invention.

The invention can be more fully understood by reference to the Figures. In FIG. 1 is shown a core or mandrel 10 which is in two parts 10a and 10b. The parts have locating and locking features and guiding pins 11 and 12 which form no part of the present invention and is also provided with bolts 13, 14 for pulling the two parts of the core or mandrel apart.

The core or mandrel has a shallow spiral groove formed on it at 15 to receive a wire 16 which is wound around the core between two electrical terminals 17 and 18 supported on the core by frangible posts 19 which will be described in more detail later.

A mold 20 is closed over the core, the mold 20 including removable sleeves 21, 22 which are closed over the terminals 17, 18.

To mold the muff, thermoplastic molding material is supplied in the direction of arrow 23 so as to fill the space between the mold cavity and the core and thus create the muff.

The steps in the method of molding in accordance with this invention will now be described in detail in relation to FIG. 2.

Figure 2A:
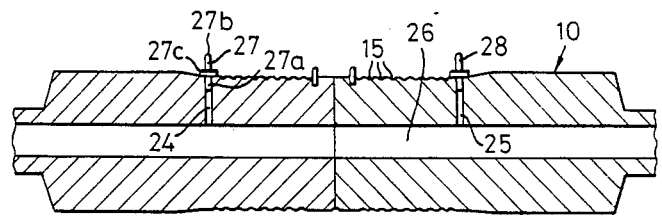
FIGS. 2a, 2b, 2c and 2d show diagrammatically steps in the molding of a terminal muff by a method embodying the present invention.
Figure 2B:
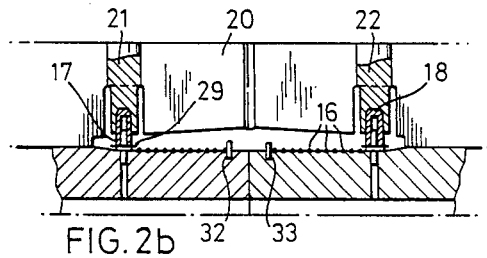

In FIG. 2a the core 10 is shown and it will be seen that there are radial bores 24 and 25 extending through the core towards its hollow interior 26. Into each of these bores is inserted a plastic post 27, 28. Each plastic post is in two parts, a lower portion 27a and an upper portion 27b joined by a flange 27c.

Placed over each post is an electrical terminal 17, 18 in the form of a ring terminal 29 integral with an upstanding hollow boss. The wire is secured to the terminal 17, 18 prior to being wound around the core 10. It is desirable to have a central portion of the core without close turns of the wire and to achieve this two additional plastic posts 32, 33 may be inserted in appropriate bores in the core so as to guide the wire although this is not essential to the process of the present invention.

The core is now ready for the molding step to take place.

The two sleeves 21, 22 are placed in position and, as the mold 20 is then closed over the assembled core, the sleeves 21, 22 come down on to the terminals.

Figure 2C:
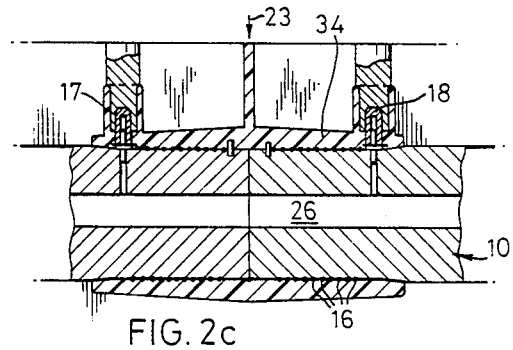

As shown in FIG. 2c, plastic molding material is then injected in the direction of arrow 23 to mold a molding muff 34. The molding material will encapsulate the two brass terminals 17, 18.

Figure 2D:
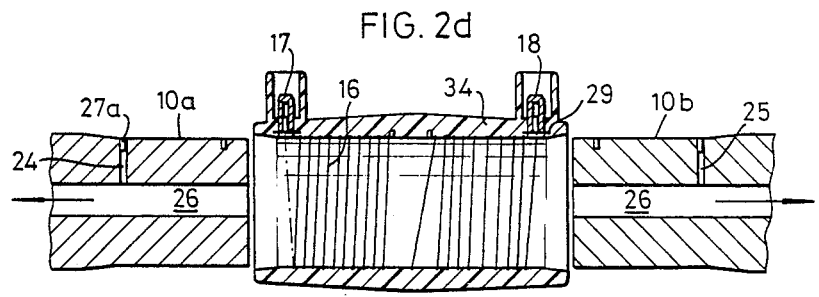

When the molding is complete the mold is opened and the two parts 10a, 10b of the core may then be removed in opposite directions axially, as shown in FIG. 2d. This removal step will cause posts 27, 28 and incidentally posts 32, 33 to shear leaving one portion of each post in the moulded muff and the other portion of each post in each part of the core.

The parts left in the core may be removed, e.g., by pushing the remaining parts radially through the bores 24, 25.

Figure 3:
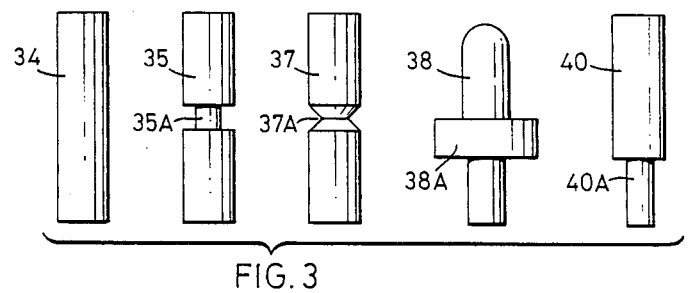
FIG. 3 shows four different types of plastic or metal posts for supporting terminals.

In FIG. 3 a number of alternative forms of posts are shown which may be in either plastic or metal. Post 34 is a plain cylindrical post, post 35 has a portion of reduced section 35A to encourage it to shear when and where required. Post 37 has a similar portion 38 of reduced section. Post 38 has a flange 38A separating the top portion of the post from the bottom portion and forming a stop to prevent the post being pushed too far into the bore in the core. Post 40 is similar to post 38 but has a portion 40A of reduced section.

Figure 4:
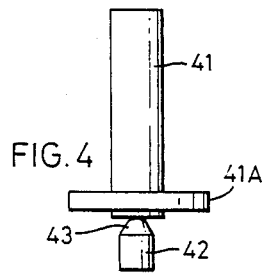
FIG. 4 shows another alternative plastic or metal post.

In FIG. 4 is shown a preferred form of post to be made of metal with an upper portion 41, a flange 41A, a lower portion 42 and a reduced section portion 43 to encourage shearing.

Figure 5:
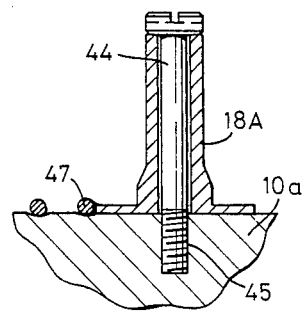
FIG. 5 shows a plastic or metal bolt used for supporting a terminal as an alternative.

In FIG. 5 is shown an alternative form of the invention in which the metal terminal 18a is held in place in the core 10a by a metal or plastic bolt 44 which screws into a threaded bore 45 in the core 10a. The bolt holds in position the metal terminal 18a to which the electric wire 47 is attached.

After molding as described previously the bolt 44 can be removed leaving the terminal in the moulded muff.

Figure 6:
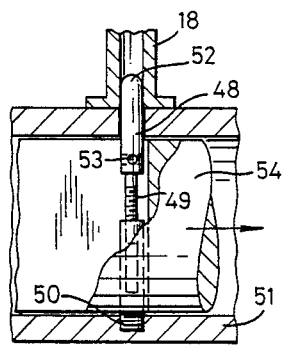
FIGS. 6 and 7 are sections through a core and mandrel incorporating a telescopic post.
Figure 7:
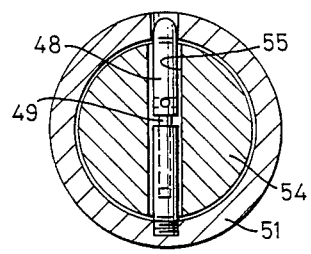

FIGS. 6 and 7 show a telescopic form of post 48 which is in two parts joined by a screwthread 49. The post can, as shown, be located at one end in a screw-threaded bore 50 in the core 51 and the other end 8 may project at 52 radially beyond the core 51. A hole 53 is provided in the upper part of the post to enable it to be rotated and thus telescopically extended or collapsed.

There will of course be two of these telescopic posts and they may be assembled before the core 51 is slid onto a mandrel 54 provided with an axially extending slot 55 to receive the posts.

After molding has been completed as described above the telescopic posts may be collapsed inwardly so as to remove the posts 52 from the interior of the metal terminals 17, 18 the telescopic posts then being in the position shown in FIG. 7. This enables the core 51 to be removed from within the molded muff.

As an alternative the telescopic posts could be arranged in two parts which are held apart by means of internal springs and may be gripped by long-nosed pliers or other suitable tools and telescopically collapsed after the mandrel 54 has been removed from the core 51.

We claim:

1. A method of manufacturing a heat-weldable thermoplastic fitting such as a pipe welding muff having at least two terminals connected by an electrical heater wire, the method comprising:
    (a) supporting the terminals on a molding core by means of removable plastic or metal posts;
    (b) winding an electrical heater wire around the core from one post to the other;
    (c) molding encapsulant around the assembly of the core, terminals, wire and posts to form a muff around the core thus encapsulating the terminals; and
    (d) removing the plastic or metal posts or parts of them.

2. A method of claim 1 in which the posts are sheared when, after molding the muff, the core is removed from the muff.

3. A method of claim 1 in which the posts are arranged so that they project into radial bores in the core and, after molding, the core is removed thus shearing the posts leaving part of each post inside the terminal and part in the core.

4. A method of claim 1 in which the core is made hollow and the parts of the posts remaining in the cores pushed inwardly to the center of the core and removed.

5. A method of claim 1 in which the posts are in the form of plastic or metal bolts which may be screwed into threaded blind bores in the core so as to support the terminals during molding.

6. A method of claim 1 in which the posts are provided in the form of telescopic posts which are arranged in bores in the hollow core and are arranged so that they project outwardly beyond the core so as to receive the terminals.

7. A method of claim 6 in which the posts are spring-loaded telescopic posts which can be gripped internally within the core by means of a tool.

* * * * *